Nov. 4, 1930.  A. J. AMSLER  1,780,696
TESTING MACHINE
Filed Dec. 3, 1927
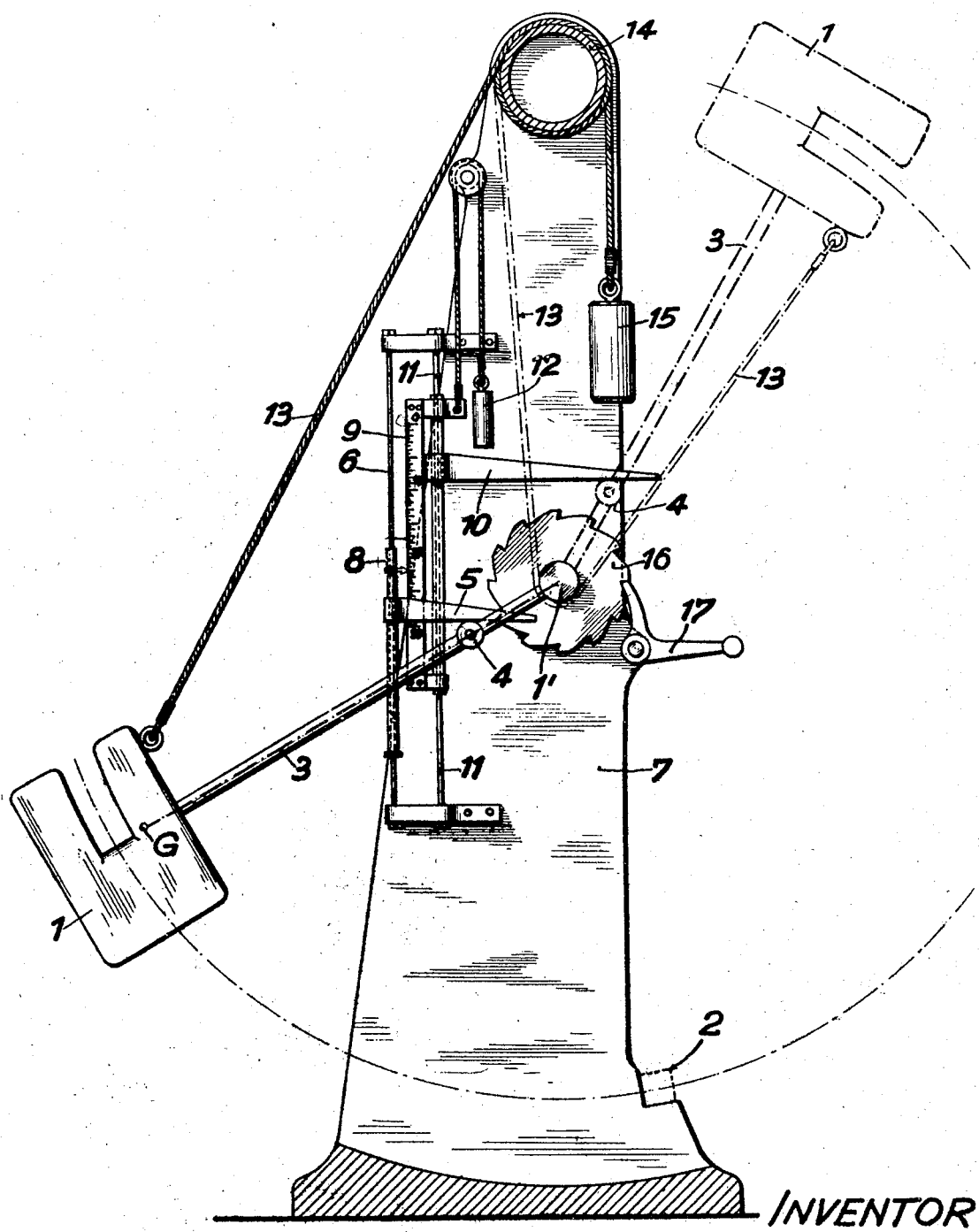
INVENTOR:
Alfred J. Amsler,
By Henry Ortly
atty.

Patented Nov. 4, 1930

1,780,696

UNITED STATES PATENT OFFICE

ALFRED J. AMSLER, OF SCHAFFHAUSEN, SWITZERLAND

TESTING MACHINE

Application filed December 3, 1927, Serial No. 237,492, and in Germany November 7, 1927.

The present invention relates to improvements in testing machines and particularly to pendulum impact testing machines.

With pendulum impact testing machines of known constructions the work of the impact necessary for breaking a test piece in two is derived from the extreme inclinations of the pendulum before and after the impact. The greatest angular deflection of the pendulum after the impact is observed by means of a pointer dispaced by the pendulum and cooperating with a dial provided with a circular scale. The reading on the scale permits to calculate the excess energy of the pendulum after the impact, which is deducted from the initial energy, that depends on the height of fall of the pendulum weight, in order to give the specific energy of the impact. As the height of the center of gravity of the pendulum is proportional to the cosine of the angle of deflection i. e. the angle by which the pendulum is out of the vertical, it is not possible to graduate the dial so that the energy of the impact can be directly read off if the pendulum has to be adjusted to different heights of fall. Further it is not possible to estimate positions of the pointer which do not coincide with a division line of the scale nor to use a vernier for that purpose as the units of the graduation are unequal.

These drawbacks are obviated with the pendulum impact testing machine according to the present invention. According to the latter a scale arranged vertically and provided with a graduation having uniform units and a member rigidly fixed to the pendulum are provided, the member causing a displacement of the pointer along a vertical guide and along the scale, which displacement is in direct proportion to the vertical component of the upward movement of center of gravity of the pendulum after the impact. The angular deviation of the pendulum is thus not transmitted to the indicating device. Preferably the construction is such that the member, which is rigidly connected to the pendulum and shaped as a circular disk, is pressed against a horizontal straight edge, which is vertically guided in a guide fixed to the machine frame, and which thereby pushes a pointer along a scale, the member, the straight edge and the guide being arranged parallel to the plane of oscillation of the pendulum, whereby it is attained that the straight edge is moved in the upward direction in proportion to the vertical component of the movement of the center of gravity of the pendulum and the pointer indicates on the scale the highest elevation of the center of gravity of the pendulum and thus the energy inherent to the pendulum after the impact, the scale being provided with a uniform graduation.

As the initial position of the pendulum is known, the indicating device has only to serve for indicating the height to which the pendulum rises after the impact. Therefore the straight edge of the indicating device is arranged completely in the range of the rising part of the oscillation of the pendulum so that the member contacts with the straight edge only after the pendulum has passed through its lowest position and the indicating device is only operative when the pendulum rises again from the lowest position upwards to complete its stroke.

If the pendulum did not encounter any resistance on its way, its center of gravity would reach a height at the end of its oscillation which is equal to that from which it had dropped down. If the pendulum has to overcome a resistance energy is consumed thereby and this loss of energy is in direct proportion to the amount by which the height of the pendulum to which the latter rises after the impact is lower than the height which it would attain if there were no resistance.

By utilizing a scale having its zero point at the top and by adjusting it so that the pointer indicates zero when the pendulum has no resistance to overcome the pointer indicates directly on the scale the impact energy spent in tests. This is obtained by providing the scale with a graduation that reads from the top downward, further which is vertically adjustable and which carries a horizontal straight edge caused to bear on the top of the member at the beginning of the test.

At the end of the test it is desirable to stop the oscillation movement of the pendulum. With pedulum impact machines of the known type this is effected by means of a brake which is manipulated by the operator, this manipulation, however, requires attention and skill. With the present pendulum impact testing machine the braking of the pendulum after it has performed its work occurs automatically. To this end a rope brake is provided comprising a flexible tension member, such as a hemp rope or the like, fixed with its one end to the pendulum whilst the other end part is wound around a non-turnable brake drum fixed to the machine frame and loaded by a weight, the arrangement being such that in the initial position of the pendulum the rope passes around the axis of the pendulum and from there to the brake drum whereby it is attained that the rope does not exert any pull when the pendulum drops down but is slack; during the upward movement of the pendulum the excess length of the rope is gradually drawn over the stationary brake drum without exerting a pull on the rope and only after the pendulum has reached its highest position after the impact and starts to swing downward again the rope prevents the pendulum from moving further in said direction.

In the drawing a constructional example of a pendulum impact testing machine according to the present invention is diagrammatically illustrated in elevation.

1 denotes the hammer head or weight of the pendulum which on dropping down from a raised initial position indicated in dash and dot lines knocks into pieces the testing bar 2. The hammer head together with the rod 3 forms the pendulum, which is turnable about the axle 1', and on the rod 3 the circular disk 4 is fixed, the center of which is situated on the straight line connecting the turning axis of the pendulum with the center of gravity G of the latter. After the pendulum has passed through its lowest position the edge of the disc 4 contacts with the straight edge 5. The latter is guided along the rod 6, which is fixed to the frame 7 of the machine. During the upward part of movement of the pendulum the straight edge 5 is pushed in the upward direction along the rod 6, whereby the disc slides or rolls along the straight edge 5. The straight edge 5 comprises a sleeve 8 sliding on the guide rod 6 and frictionally held on the latter, a hand fixed to the sleeve 8 cooperates with a scale 9 to indicate the height to which the straight edge 5 has been raised. The graduation of the scale is uniform and reads from top to bottom. The straight edge 10 is rigidly connected to the scale 9 and is lowered to bear on the disk 4 before the pendulum is released to perform the impact. The scale 9 is displaceable along the guide rod 11, it is in frictional engagement with the latter and a counter-weight 12 balances the weight of the scale. 16 denotes a ratchet wheel and 17 a pawl for fixing the pendulum in its raised position before starting the test.

The rope 13, which is connected to the hammer 1, the drum 14, which is rigidly fixed to the frame 17, and the weight 15 form together the rope brake.

When the hammer drops and rises again the slack part of the rope, which is several times loosely wound around the drum 14, is taken up by the action of the weight 15 but with such a retardation that the rope cannot exert any pull on the rising pendulum. After the pendulum has reached it highest position following upon the impact it drops slightly and is caught and held in position by the rope 13. In order to lower the pendulum again the weight 15 is lifted by hand.

Rope brakes of this type in which the braking means permit a movement in one direction, without influencing said movement, and brake a movement in the other direction may also be used for other purposes.

I claim:

1. A testing machine of the type described, comprising in combination, a pendulum comprising a swingably mounted arm and a weight carried by said arm and adapted to break a test piece by its impact when moving downward from a raised position of the arm, and means adapted to indicate the position to which the center of gravity of the weight rises after the impact, which means include a vertically arranged scale uniformly graduated and a hand pushed by the pendulum along said scale for indicating the vertical component of the upward movement of the weight.

2. A testing machine of the type described, comprising in combination, a pendulum comprising a swingably mounted arm and a weight carried by said arm and adapted to break a test piece by its impact when moving downward from a raised position of the arm, a vertically arranged scale uniformly graduated, a circular member arranged on said arm so that the center of said member is situated on the line passing through the center of gravity of said weight and the turning axis of the pendulum, and a hand cooperating with said scale acted upon by said member so as to indicate the vertical component of the upward movement of said weight after the impact.

3. A testing machine of the type described, comprising in combination, a pendulum comprising a swingably mounted arm and a weight carried by said arm and adapted to break a test piece by its impact when moving downward from a raised position of the arm, a vertically arranged scale uniformly graduated, a circular member arranged on said arm so that the center of said member is situated on the line passing through the center of gravity of said weight and the turning axis of the pendulum, vertically arranged guide means, a horizontal straight edge guided by said guide means and acted upon by said member when the pendulum swings in the upward direction after the impact, and a hand operatively connected to said straight edge and cooperating with said scale for indicating the vertical component of said upward movement.

4. A testing machine of the type described, comprising in combination, a pendulum comprising a swingably mounted arm and a weight carried by said arm and adapted to break a test piece by its impact when moving downward from a raised position of the arm, a vertical guide, a uniformly graduated scale adjustable along said guide, a circular member arranged on said arm so that the center of said member is situated on the line passing through the center of gravity of said weight and the turning axis of the pendulum, a horizontal straight edge rigidly fixed to said scale and cooperating with said member for adjusting the scale in height to correspond to the initial position of the pendulum, a further vertically guided, horizontal straight edge acted upon by said member when the pendulum swings in the upward direction after the impact, a hand operatively connected to the latter straight edge and cooperating with said scale for indicating the vertical component of said upward movement, and thereby the amount of energy spent in the impact, and means adapted to automatically brake the movement of the pendulum after it has attained its highest position following upon the impact.

5. A testing machine of the type described, comprising in combination, a pendulum comprising a swingably mounted arm and a weight carried by said arm and adapted to break a test piece by its impact when moving downward from a raised position of the arm, a vertical guide, a uniformly graduated scale adjustable along said guide, a circular member arranged on said arm so that the center of said member is situated on the line passing through the center of gravity of said weight and the turning axis of the pendulum, a horizontal straight edge rigidly fixed to said scale and cooperating with said member for adjusting the scale in height to correspond to the initial position of the pendulum, a further vertically guided, horizontal straight edge acted upon by said member when the pendulum swings in the upward direction after the impact, a hand operatively connected to the latter straight edge and cooperating with said scale for indicating the vertical component of said upward movement and thereby the amount of energy spent in the impact, and a rope brake connected to said pendulum and adapted to automatically brake the movement of the pendulum after it has attained its highest position following upon the impact.

6. A testing machine of the type described, comprising in combination, a pendulum comprising a swingably mounted arm and a weight carried by said arm and adapted to break a test piece by its impact when moving downward from a raised position of the arm, a vertical guide, a uniformly graduated scale adjustable along said guide, a circular member arranged on said arm so that the center of said member is situated on the line passing through the center of gravity of said weight and the turning axis of the pendulum, a horizontal straight edge rigidly fixed to said scale and cooperating with said member for adjusting the scale in height to correspond to the initial position of the pendulum, a further vertically guided, horizontal straight edge acted upon by said member when the pendulum swings in the upward direction after the impact, a hand operatively connected to said straight edge and cooperating with said scale for indicating the vertical component of said upward movement and thereby the amount of energy spent in the impact, and a rope brake adapted to automatically brake the movement of the pendulum after it has attained its highest position following upon the impact, said rope brake comprising a rope connected with its one end to said weight, a non-rotatable brake drum around which the other end part of said rope is wound, and a weight suspended from said other end, said rope being passed around the axis of the pendulum when the latter is in its raised position to prevent a pulling effect on the pendulum.

7. In a testing machine of the type described, a pendulum, a rope brake comprising a rope, a non-rotatable brake drum and a weight, said rope being connected at one end to the pendulum the movement of which has to be braked, and then passed around the axis of said pendulum when the latter is in its raised position and having its other end portion wound around the brake drum and loaded by the weight.

In testimony whereof, I have signed my name to this specification.

ALFRED J. AMSLER.